United States Patent

[11] 3,620,708

| [72] | Inventor | Louis E. Ott<br>St. John, Ind. |
|---|---|---|
| [21] | Appl. No. | 35,240 |
| [22] | Filed | May 6, 1970 |
| [45] | Patented | Nov. 16, 1971 |
| [73] | Assignee | Standard Oil Company<br>Chicago, Ill. |

[54] LIQUID FERTILIZERS INCLUDING SOLUBLE ZINC FROM ZINC OXIDE
13 Claims, No Drawings

[52] U.S. Cl. .................................................. 71/33,
71/53, 71/64 C
[51] Int. Cl. .................................................. C05b,
C05b 7/00, C05b 21/00
[50] Field of Search ......................................... 71/1, 31,
33, 34, 36, 43, 53, 63, 64, 64 C, 48; 23/50, 55,
105, 107

[56] References Cited
UNITED STATES PATENTS

| 3,244,500 | 4/1966 | Stinson et al. ............... | 71/43 X |
| 3,130,034 | 5/1964 | Young ............................ | 71/1 |

*Primary Examiner*—S. Leon Bashore
*Assistant Examiner*—Thomas G. Scavone
*Attorneys*—Arthur G. Gilkes, William T. McClain and Edwin C. Lehner ABSTRACT: Ammonia-basic aqueous zinc-ammonium-phosphate solutions, containing up to about 20 weight percent zinc from zinc oxide, provide soluble zinc in liquid fertilizers. The solution is at least 15 percent by weight water and includes 0.3–0.52 mols $P_2O_5$ per mol of zinc and at least 2.4 mols of ammonia per mol of zinc.

LIQUID FERTILIZERS INCLUDING SOLUBLE ZINC FROM ZINC OXIDE

BACKGROUND OF THE INVENTION

1. Field of the Invention

This invention relates to utilization of zinc oxide as source of zinc in liquid fertilizers. More particularly, it relates to ammonia-basic zinc-ammonium-phosphate solutions, and their preparation from zinc oxide.

2. Description of Prior Art

Zinc is an essential element in plant nutrition, and a deficiency thereof in the soil is a common cause of poor plant growth. Liquid fertilizers, as clear liquids or suspensions, are advantageously used as vehicles for applying zinc to soil to remedy zinc deficiencies.

Zinc oxide, a substantially water-insoluble solid, is the most economical source of zinc for agricultural purposes. However, since it is insoluble in anhydrous and aqua ammonia, and has only limited solubility or forms water-insoluble zinc ammonium salts in acidic liquid ammonium phosphate fertilizers, it has not been possible to effectively utilize this low cost source of zinc in liquid plant nutrient compositions.

According to information published by Tennessee Valley Authority, zinc oxide is soluble only to the extent of 0.05 weight percent zinc in 8-24-0 (N-P-K) ammonium orthophosphate fertilizer solutions, which amount is insufficient for agricultural purposes; and in high analysis liquid N-P-K fertilizers such as 10-34-0 (N-P-K) ammoniated polyphosphate solutions made from wet process superphosphoric acid, and 11-17-0 (N-P-K) ammoniated polyphosphate solutions made from furnace grade superphosphoric acid, zinc oxide is soluble only to the extent of 2.25 and 3.0 weight percent zinc, respectively. The improved solubility of zinc oxide in the high analysis liquid fertilizers is apparently due to the metal chelating effect of the polyphosphate ions present in such solutions. While it is possible to obtain practical amounts of zinc in solution via zinc oxide in the aforesaid high analysis liquid fertilizers, it has been found that such solutions are unstable or incompatible, with formation of precipitates, when diluted or blended with other liquid fertilizer ingredients. Consequently, such zinc-containing high analysis fertilizers are only suitable for direct application to soil and not as stock solutions for incorporating zinc in other types of liquid fertilizers such as, aqua ammonia, urea ammonium nitrate solutions, low analysis ammonium phosphate solutions, or in mixed N-P-K liquid fertilizers or suspensions containing potassium chloride as the source of potassium. Hence, the fertilizer industry has had to resort to more costly zinc-containing materials, such as zinc sulfate or organic zinc chelates, and techniques for incorporating zinc in liquid fertilizers, especially those containing phosphates.

SUMMARY OF THE INVENTION

It has been discovered that zinc oxide can be used effectively as the source of zinc in liquid fertilizers. According to the invention, stable, homogeneous, single-phase ammonia-basic aqueous zinc-ammonium-phosphate solutions containing up to about 20 weight percent zinc are obtained by combining reactants consisting essentially of (A) zinc oxide; (B) a phosphate ion-affording member of the group consisting of phosphorus pentoxide, acyclic phosphoric acid, ammonium phosphate or mixtures thereof; (C) ammonia; and (D) water, under liquid phase conditions.

In the preparation of the zinc-containing solutions of this invention, the zinc oxide, the phosphate ion-affording reactant, ammonia and water are brought together and a chemical reaction ensues. The resulting product, the chemical composition of which is presently unascertainable, is a single-phase homogeneous basic solution of an ionic complex of water, zinc, ammonium and phosphate ions. Accordingly, the zinc-containing product can only be defined in terms of the process by which it is made.

The compositions of this invention are formed by the method comprising forming an ammonia-basic solution that contains per 100 parts by weight of solution at least 15 parts by weight water, up to about 0.31 mols of zinc, and per mol of zinc in said solution about 0.3-0.52 mols $P_2O_5$ and at least 2.4 mols of ammonia, by combining and reacting, under liquid phase reaction conditions, (A) an amount of zinc oxide that provides up to about 0.31 mols of zinc per 100 parts by weight of said solution, (B) an amount of a member of a group consisting of phosphorous pentoxide, acyclic phosphoric acid, ammonium phosphate or mixtures thereof that provides about 0.3-0.52 mols of $P_2O_5$ per mol of zinc in 100 parts by weight of said solution, (C) an amount of ammonia sufficient to provide at least 2.4 mols of ammonia per mol of zinc in 100 parts by weight of said solution, and (D) water necessary to form 100 parts by weight of said solution.

Effective utilization of zinc oxide in the formation of the zinc-containing solutions of this invention is dependent upon the interdependent molar ratios of reactants. For every 100 parts by weight of solution, the phosphate-ion affording reactant must provide a molar ratio of $P_2O_5/Zn$ within the range of about 0.3-0.52, preferably about 0.33-0.47, and optimally about 0.4; and the molar ratio of $NH_3/Zn$ must be at least 2.4, preferably about 6-9. When the $P_2O_5/Zn$ ratio is less than about 0.3, there is insufficient solubilization of zinc oxide or when above about 0.52, insoluble precipitates form, even though the $NH_3/Zn$ ratio is above 2.4 in the reactant mixture. A minimum $NH_3/Zn$ molar ratio of 2.4 is required for solubilization of zinc oxide in a reactant mixture containing a $P_2O_5/Zn$ molar ratio within the range of about 0.3-0.52. Water is also an essential element of this invention, and a minimum of about 15 weight percent is required for formation of the zinc-containing solutions described herein.

For convenience and ease in understanding the invention disclosed herein, the amounts and molar proportions of reactant are based upon 100 parts by weight of the zinc-containing solution obtained. The maximum amount of zinc that can be solubilized in such solutions is about 20 weight percent zinc or about 25 weight percent zinc oxide. Accordingly, the amounts of the reactants are based upon the zinc content of the solution to be formed.

The zinc oxide reactant may be either French process or American process zinc oxide. Since American process zinc oxide contains impurities, it may be necessary to filter the resultant product to remove such impurities, if clear zinc-containing solutions are desired.

The phosphate ion-affording reactant is a member of the group consisting of phosphorus pentoxide, acyclic phosphoric acid, ammonium phosphate or mixtures thereof. This reactant provides the requisite molar proportions of P2O5 necessary to solubilize zinc oxide. Accordingly, the amounts to use are based on its P2O5 equivalency. The term "acyclic phosphoric acid" as used herein shall mean and include reagent ortho- and pyro-phosphoric acids; merchant-grade wet process phosphoric acid containing about 45-55% P2O5; acyclic condensed phosphoric acid, commonly referred to as superphosphoric acid, derived from wet process phosphoric acid or furnace grade superphosphoric acid, containing about 65-90% P2O5. The term "ammonium phosphate" as used herein shall mean and include the simple ammonium (mono-, di- or tri-) salts of ortho- and pyro-phosphoric acids, such as ammonium dihydrogen phosphate, and the anhydrous or aqueous ammoniated phosphate products obtained by ammoniation of the aforementioned merchant-grade and acyclic superphosphoric acids. Illustrative of the ammoniated phosphate products are the aqueous N-P-K solutions (8-24-0, 10-34-0 and 11-37-0) and the mono- and di-ammonium phosphate melts of the fertilizer industry.

The requisite amount of the ammonia reactant can be furnished in whole or in part from anhydrous or aqua ammonia (ammonium hydroxide). When an ammonium phosphate is used as the phosphate ion-affording reactant, it is to be understood that part of the requisite amount of the ammonia reactant will be furnished by the ammonium phosphate and it is only necessary to add additional ammonia to meet the ammonia requirement.

It is only necessary to add water to the reactant mixture when the water of reaction and any water contributed by reactants B and C is insufficient to meet the minimum water requirement and form 100 parts by weight of solution.

The combination of the reactants involves an exothermic reaction which is initiated readily at room temperature, e.g. about 75° F., or even below. The reaction may require external cooling of either the reaction mixture as the reaction proceeds or the reactants prior to the initiation of the reaction. It is generally advantageous to regulate the reaction temperature by the slow or portionwise addition of the phosphate reactant to the other reactants.

The reaction conditions or order of addition of reactants are not critical. Inasmuch as ammonia is a volatile reactant, it is only essential that liquid phase reaction conditions be maintained during the reaction, which conditions are readily apparent to one skilled in the art. The reaction is preferably conducted at temperatures below 105° F. and at atmospheric pressure. However, it may be conducted at higher temperatures provided superatmospheric pressure is used. The reactants may be combined in any order. However, it has been found that addition of the phosphate reactant to the aqueous mixture of the other reactants avoids formation of temporary precipitants and the reaction mixture forms a clear solution within 30 minutes after completion of the phosphate reactant addition.

Maximum manufacturing efficiency is obtained when zinc oxide is combined with previously prepared and colled aqua ammonia and aqueous 10–34–0 ammoniated polyphosphate solutions made from furnace grade superphosphoric acid. Use of such preformed aqueous reactants, minimizes the need for external cooling during the reaction.

The zinc-containing solutions formed in accordance with this invention are useful per se as liquid fertilizers for applying both zinc and primary plant nutrients to the soil. Solutions containing about 5–15 weight percent (about 0.07–0.23 mols) of zinc, a P2O5/Zn molar ratio of about 0.33–0.47, and a NH3/Zn molar ratio of about 6–9 are especially useful as additive concentrates for incorporating soluble and compatible zinc in other liquid fertilizers such as, aqua ammonia and urea ammonium nitrate solutions, and various grades of the mixed N–P–K clear liquid and suspension fertilizers. The use of the solutions of this invention containing about 5–15 weight percent zinc as stock solutions for providing stable and compatible soluble zinc in liquid fertilizers avoids the need for specially manufacturing and storing zinc-containing liquid fertilizers at the locus of their manufacture. Field blending of such stock solutions with the usual liquid fertilizers to obtain desired amounts of zinc therein at the time of application is satisfactorily obtained. Thus, special techniques heretofore required for incorporating zinc in liquid fertilizers is avoided.

DESCRIPTION OF THE PREFERRED EMBODIMENTS

In the following examples, all parts and percentages are by weight unless otherwise indicated; and the ammonium hydroxide or aqua ammonia reactant contained 28% NH3.

For purposes of brevity in the examples, the various aqueous ammonium phosphate solutions used as the phosphate ion-affording reactant will be identified as API, APII, and APIII.

API is an 8–24–0 (N–P–K) solution, containing about 66.3% water and about 24% P2O5 and having an ammonia equivalent of about 9.7 percent and a pH of 6.63, obtained by reacting 38.5 parts of reagent grade ortho-phosphoric acid (86.2% H3PO4), 34.8 parts of ammonium hydroxide and 26.7 parts water as ice to moderate the reaction.

APII is a 10–34–0 (N–P–K) solution, having a pH of 6.2 and an ammonia equivalent of about 12.2 percent and containing about 53.9 percent water and about 34% P2O5, obtained by reacting 47.3 parts wet process acyclic superphosphoric acid (about 72% P2O5) and 52.7 parts of a solution of 12.2 parts of ammonia and 40.5 parts water. The P2O5 content of the aforesaid superphosphoric acid was composed of about 52 percent ortho-phosphoric, about 38 percent pyrophosphoric and about 10 percent tripoly and higher phosphoric acid species; and the acid contained about 0.5 percent iron oxide, about 0.4 percent aluminum oxide and about 0.2 percent magnesium oxide metal impurities.

APIII is a 10–34–0 (N–P–K) solution, having a pH of 6 and an ammonia equivalent of about 12.2 percent and containing about 53.9 percent water, about 34% P2O5, obtained by reacting 44.8 parts of furnace grade acyclic superphosphoric acid (about 76% P2O5) and 55.2 parts of a solution of 12.2 parts ammonia and 43.0 parts water.

EXAMPLE 1

A clear solution containing about 3 weight percent (about 0.046 mol) zinc was formed at atmospheric pressure by slowly adding, with stirring, 14.25 parts of API to a reactant mixture, having a temperature of about 70° F., of 3.75 parts zinc oxide (about 0.046 mol zinc), 41.0 parts ammonium hydroxide (about 0.675 mols ammonia), and 41.0 parts water, over a 6 minute period with continuing mixing for a 10 minute period. Completion of the reaction is shown by clearing of the reactant mixture. The amount of API reactant furnished about 0.024 mol P2O5 and about 0.8 mol ammonia equivalent in the solution containing a P2O5/Zn molar ratio of about 0.52 and a NH3/Zn ratio of about 16.4. A temperature rise of about 30° F. occurred during the reaction.

EXAMPLE 2

When, as in example 1, 14.25 parts of the API reactant was added to a slurry of 3.75 parts zinc oxide in 82 parts water, no reaction occurred even though the P2O5/Zn ratio was about 0.52. However, the ammonia contributed by API gave a NH3/Zn ratio of only about 1.74. This example thus shows that in order to obtain solubilization of zinc oxide it is necessary to use additional ammonia and thereby form an aqueous ammonia-basic reaction medium.

EXAMPLE 3

To an aqueous reactant mixture containing 6.2 parts zinc oxide (about 0.076 mol zinc) and 72.8 parts (about 1.2 mols ammonia) ammonium hydroxide was added, as in example 1, 21 parts (about 0.036 mols P2O5 and an ammonia equivalent of about 0.11 mols ammonia) of API. The resultant clear solution contained about 5 percent zinc, a P2O5/Zn ratio of about 0.47 and a NH3/Zn ratio of about 15.8.

EXAMPLE 4

To a reactant mixture containing 12.5 parts zinc oxide (about 0.153 mol zinc), 30 parts ammonium hydroxide (about 0.5 mol ammonia) and 27.5 parts water was added, as in example 1, 30 parts of API (about 0.051 mol P2O5 and an ammonia equivalent of about 0.17) to form a clear solution containing about 10 percent zinc. The P2O5/Zn and NH3/Zn molar ratios in the solution were about 0.33 and 4.3, respectively.

EXAMPLE 5

As in example 1, 30 parts of APII (about 0.072 mol P2O5 and an ammonia equivalent of about 0.21 mol) were added to a reactant mixture containing 12.5 parts zinc oxide (about 0.153 mol zinc) and 57.5 parts ammonium hydroxide (about 0.95 mol ammonia) to form a clear solution containing about 10 percent zinc, a P2O5/Zn ratio of about 0.47 and a NH3/Zn ratio of about 7.5. This solution had a mild steel corrosion rate of about 13 mils per year.

When water was substituted for the ammonium hydroxide in the above reactant mixture, no visible reaction occurred even though the APII reactant contributed sufficient ammonium ion to provide a NH3/Zn ratio of about 1.4. As in accordance with prior art teachings, some solubilization of zinc oxide (amount not determined) was obtained after an extended mixing and holding period. Thus, complete solubilization is only obtained when ammonia is present in amounts sufficient to be a reactant and to form an ammonia-basic aqueous solution containing zinc, ammonium and phosphate ions.

EXAMPLE 6

A clear solution containing about 15.2 percent (about 0.23 mol) zinc was formed by combining 49.0 parts of APII (about 0.117 mol P2O5 and ammonia equivalent of 0.34 mols), as in example 1, with a reactant mixture of 19.0 parts zinc oxide and 32.0 parts ammonium hydroxide (about 0.53 mols ammonia).

EXAMPLE 7

A clear solution containing about 20.0 percent (about 0.31 mol) zinc, a P2O5/Zn ratio of about 0.39 and an NH3/Zn ratio of about 2.4 was formed by adding 50 parts of APII (about 0.12 mol P2O5 and ammonia equivalent of 0.35 mol) to a slurry of 25 parts zinc oxide (about 0.31 mol zinc) in 25 parts of ammonium hydroxide.

EXAMPLE 8

A 10 percent zinc solution was obtained by adding 25 parts of APIII (about 0.06 mols P2O5 and ammonia equivalent of 0.18 mol) to a slurry of 12.5 parts zinc oxide (0.153 mol zinc) in 62.5 parts ammonium hydroxide (about 1 mol ammonia). The molar ratios of P2O5/Zn and NH3/Zn in the solution were about 0.39 and 7.9, respectively. No salting out occurred when this solution was stored at −20° F., but it did form two distinct liquid layers which were completely miscible and recombined to form a single-phase homogeneous solution when warmed up.

EXAMPLE 9

This example illustrates the use of mono-ammonium dihydrogen phosphate to form a 10 percent zinc solution. To a slurry of 12.5 parts zinc oxide in 40.0 parts ammonium hydroxide (about 0.66 mol ammonia) was added 47.5 parts of a solution containing 14.5 parts of said phosphate salt (about 0.06 mol P2O5 and ammonia equivalent of about 0.22 mol) dissolved in 33 parts of water. The solution contained a P2O5/Zn ratio of about 0.41 and a NH3/Zn ratio of about 5.7.

EXAMPLE 10

A 10 percent zinc solution containing a P2O5/Zn ratio of about 0.39 and NH3/Zn ratio of about 7.8 was obtained by adding 13.7 parts of ortho-phosphoric acid (86.2% H3PO4, about 0.06 mol P2O5) to a reactant mixture containing 12.5 parts zinc oxide (about 0.153 mol zinc), 72.8 parts ammonium hydroxide (about 1.2 mol ammonia) and 1.0 part water.

EXAMPLE 11

The addition of 11.7 parts (about 0.06 mol P2O5) of furnace grade superphosphoric acid to a reactant mixture of 12.5 parts zinc, 72.8 parts ammonium hydroxide and 3.5 parts water formed a 10 percent zinc solution containing a P2O5/Zn ratio of about 0.39 and an NH3/Zn ratio of about 7.8.

EXAMPLE 12

A solution containing about 20 percent zinc, about 15 percent water and a P2O5/Zn ratio of about 0.52 and an NH3/Zn ratio of about 8 is formed by slowly mixing 22.8 parts of phosphorus pentoxide with a reactant mixture of 25.0 parts zinc oxide (about 0.31 mol zinc), 41.7 parts (about 2.5 mols) ammonia and 10.5 parts water.

EXAMPLE 13

The compatibility of the 10 percent zinc solution of example 5 with liquid fertilizers containing potassium chloride as the source of potassium was ascertained. Amounts of this solution were added to 5–10–10, 4–13–10, 4–8–12 and 8–8–8 liquid fertilizers to provide concentrations of 0.1, 0.25, 0.5 1.0 and 2.0 percent zinc therein. All of the resultant zinc-containing fertilizers were stable for 24 hours. After 7 days storage at room temperature, about 75°–80° F., a slight precipitate was noticed in only the 5–10–10 and 4–13–10 fertilizers containing 1.0 percent zinc, and small crystals formed in the 5–10–10 and 8–8–8 products at the 2.0 percent zinc level, all of the other samples were clear.

EXAMPLE 14

Urea-ammonium nitrate solutions corresponding to 32–0–0 (N–P–K) containing zinc concentrations set forth in example 13 from the solution of example 5 were all stable for 24 hours. After 7 days storage at room temperature only the 1.0 and 2.0 zinc solutions showed the formation of very small crystals, all other solutions remaining clear.

EXAMPLE 15

The addition of zinc salts or organic chelated forms of zinc to suspension fertilizers containing potassium chloride generally produce a pronounced increase in viscosity thereof or form precipitates therein. When the zinc-containing solution of example 5 was added in varying amounts to 2–6–12, 4–12–D AND AB–6–12 (N—P–K) suspensions to incorporate 0.1, 0.25, 0.5, 1.0 and 2.0 percent zinc therein, no appreciable change in viscosity was found in any of the resultant suspensions, either initially or after 24 and 7 days storage. Further, no evidence of incompatibility by formation of precipitates was found in any of the zinc-containing suspensions containing soluble zinc provided by the solutions of this invention.

It will be apparent to one skilled in the fertilizer art that the present invention provides a simple and effective means for using zinc oxide as the source of zinc in liquid fertilizers. In addition to their utility in liquid fertilizers, the solutions are also useful as corrosion inhibitors in highly corrosive aqueous ammoniacal solutions containing nitrate, sulfate, and chloride anions. Further, the low corrosivity characteristics of the zinc-containing solutions obtained by the invention permits their storage and handling in mild carbon steel and thus avoids the necessity of using special metals such as stainless steel.

I claim;

1. The method of preparing ammonia-basic aqueous zinc-ammonium-phosphate solutions containing up to about 20 weight percent zinc from zinc oxide which comprises forming an ammonia-basic aqueous solution that contains per 100 parts by weight of solution at least 15 parts by weight water, up to about 0.31 mols zinc, and per mol of zinc in said solution about 0.3–0.52 mols of $P_2O_5$ and at least 2.4 mols of ammonia, by combining and reacting, under liquid phase reaction conditions, (A) an amount of zinc oxide that provides up to about 0.31 mols zinc per 100 parts by weight of solution, (B) an amount of a member of the group consisting of phosphorus pentoxide, acyclic phosphoric acid, ammonium phosphate or mixtures thereof that provides about 0.3–0.52 mols of $P_2O_5$ per mol of zinc in said solution, (C) an amount of ammonia sufficient to provide at least 2.4 mols of ammonia per mol of zinc in said solution, and (D) water necessary to form 100 parts by weight of said solution.

2. The process of claim 1 wherein reactant A provides about 0.07–0.23 mols zinc.

3. The process of claim 2 wherein the mols of $P_2O_5$ per mol of zinc is within the range of about 0.33–0.47.

4. The process of claim 3 wherein reactant B is ammonium dihydrogen phosphate.

5. The process of claim 3 wherein reactant B is an aqueous 8-24-0 ammoniated orthophosphate solution; and reactant C provides at least 3.5 mols of ammonia per mol of zinc in the solution.

6. the process of claim 3 wherein reactant B is an aqueous 10-34-0 ammoniated polyphosphate solution.

7. The process of claim 6 wherein said 10-34-0 solution is derived from furnace grade superphosphoric acid.

8. The process of claim 3 wherein reactant B is orthophosphoric acid.

9. The process of claim 3 wherein reactant B is furnace grade superphosphoric acid.

10. The process of claim 3 wherein reactant B is phosphorus pentoxide.

11. The process of claim 3 wherein reactant A provides about 0.153 mols zinc; reactant B is acyclic superphosphoric acid or its aqueous ammoniated solution containing about 10 weight percent N and about 34 weight % $P_2O_5$; and reactant C provides a molar ratio of $NH_3/Zn$ within the range of about 6–9; said solution containing about 10 weight percent zinc.

12. The process of claim 11 wherein reactant B is added to a preformed mixture of reactants A, C and D.

13. The composition produced by the process of claim 1.

* * * * *

PO-1050
(5/69)

UNITED STATES PATENT OFFICE
CERTIFICATE OF CORRECTION

Patent No. 3,620,708      Dated   November 16, 1971

Inventor(s)   Louis E. Ott

It is certified that error appears in the above-identified patent and that said Letters Patent are hereby corrected as shown below:

Column 1, line 31, the term "11-17-0" should read --11-37-0--.

Column 6, line 32, "4-12-D AND AB-6-12" should read --4-12-24 and 12-6-12--.

Wherever the term "P2O5" appears, read --$P_2O_5$--.

Wherever the term "NH3" appears, read --$NH_3$--.

Wherever the term "H3PO4" appears, read --$H_3PO_4$--.

Signed and sealed this 30th day of May 1972.

(SEAL)
Attest:

EDWARD M. FLETCHER, JR.                ROBERT GOTTSCHALK
Attesting Officer                       Commissioner of Patents